July 31, 1962 HIROSHI GOTO ET AL 3,047,428

MAGNETIC RECORDING MATERIAL

Filed Jan. 26, 1959

United States Patent Office 3,047,428

Patented July 31, 1962

3,047,428
MAGNETIC RECORDING MATERIAL

Hiroshi Goto and Goro Akashi, Odawara-shi, Kanagawa, Japan, assignors to Fuji Photo Film Co., Ltd., Kanagawa-ken, Japan, a corporation of Japan Filed Jan. 26, 1959, Ser. No. 789,028
Claims priority, application Japan Jan. 27, 1958
2 Claims. (Cl. 117—169)

This invention relates to magnetic recording media such as tapes and the like.

Recording tapes are known wherein acicular particles of magnetic iron oxide are oriented in the recording direction thereby to give the optimal characteristic in that direction. This known magnetic recording material has a disadvantage in that the optimal direction is limited to one direction and the characteristic of the material is poor in the direction perpendicular to the recording direction.

It is an object of the invention to provide a magnetic recording material which has equally good characteristics in all directions within a specified plane, so that it can be used in an apparatus of any type irrespective of recording direction.

For instance, one type of magnetic video tape has its video recording widthwise thereon, while the recording of sound and control signals is made lengthwise. Thus, it is impossible for acicular particles to have satisfactory characteristics in both systems.

The magnetic recording material according to the invention can be however used for sound and video recording in any system, as the material is composed of flattened particles of magnetic iron oxide of which each particle is arranged so as to generally place its flat surface in a given plane so that it may exhibit a sharp magnetization curve in any direction.

In order that the invention may be fully understood, it will now be described with reference to the accompanying drawings, in which.

Figures 1, 3:
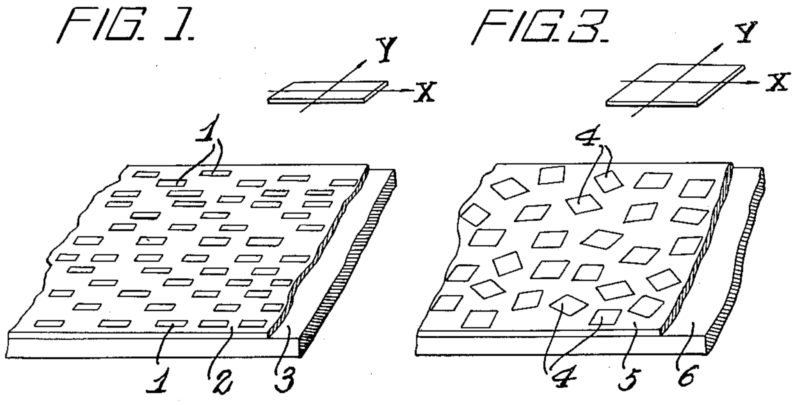
FIG. 1 is a perspective view showing schematically a fragment of known magnetic recording material.
FIG. 3 is a perspective view showing schematically a fragment of the magnetic recording material according to the invention.
Figure 2:
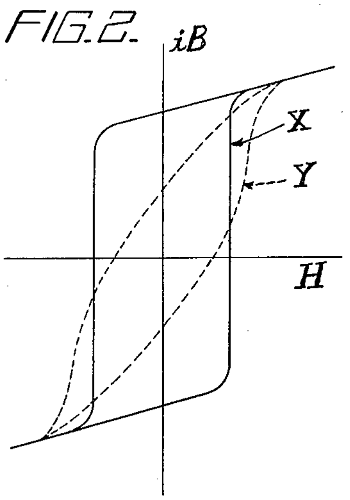
FIG. 2 shows its B—H curve.

In the known magnetic recording material of FIG. 1, acicular particles 1 of magnetic iron oxide are aligned in one direction within a magnetic layer 2 coated on a carrier 3. As shown in FIG. 2, the B—H curve in this material is steep in the direction X of length of the acicular particles but gently sloping in the direction Y perpendicular thereto, so that the characteristic is good in the first direction and bad in the latter.

Figure 4:
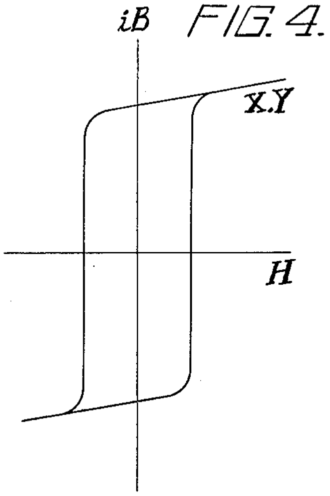
FIG. 4 shows its B—H curve.

On the contrary, the flattened particles 4 of magnetic iron oxide in the material of the invention shown in FIG. 3 are so maintained in a magnetic layer 5 coated on a carrier 6 that a flat surface of each particle is placed in a plane. As shown in FIG. 4, this material exhibits a sharp B—H curve in every direction inclusive of the directions X and Y, all lying in the same plane, which is parallel to carrier 6, so that the characteristic is good in all directions.

Such difference in characteristics between the two materials is due to the fact that in the case of the known magnetic recording material, the demagnetizing factor approximates zero in the direction of the length of the acicular particles and is close to $2\pi$ in the direction perpendicular thereto, while on the contrary in the material of the invention said factor approximates to zero in every direction within a specified plane of the fully flattened particles. The latter shows that there is almost no shear of B—H curve which may be caused by self-demagnetization in all direction within the plane of the flattened particles of magnetic iron oxide and hence a sharp B—H curve is exhibited in every direction within said plane.

The magnetic recording material of the invention may be produced, for example, in the following way:

To an aqueous solution of ferrous sulfate is added caustic alkali in the presence of nitrogen. The precipitate of ferrous hydroxide thus produced is heated in the mother liquor at 80° C. for five hours whereby ferrous hydroxide is developed in the form of flattened substantially square particles with a mean size of $0.1\mu \times 1\mu \times 1\mu$, the thickness being thus substantially less than the length and width. This is thought to be due to the fact that the crystal of ferrous hydroxide has a layer structure of $Fe^{++}$ and $OH^-$ ions wherein the ionic bond between $OH^-$ layers is very weak.

The particles of the flattened ferrous hydroxide thus formed are slowly oxidized in a closed vessel at 300° C. thereby forming ferromagnetic particles of $\gamma$-ferric oxide which are of flat, porous, board-like shape.

A magnetic coating lacquer prepared by using said magnetic material is applied to a carrier and dried. With shrinkage of the thickness of the resulting coating layer during the drying, each of the flattened particles is arranged in a plane within the layer. The magnetic recording material thus obtained gives a sharp B—H curve in all directions within the plane. The coercive force necessary for sound recording characteristic can be obtained by adjusting the size and porosity of each particle and the composition of magnetic material.

The flattened ferrous hydroxide may also be turned into non-magnetic $\alpha$-ferric oxide, reduced with hydrogen at 350° C. and then gradually oxidized to form $\gamma$-ferric oxide. A coating lacquer is prepared from this magnetic material and applied in the manner as above described, to obtain a good magnetic recording material.

Further, an aqueous solution of ferrous sulfate can be subjected to electrolysis in an electrolyzer. Iron thus separated is scraped from the surface of the electrode at intervals to obtain powdered iron particles of flat board-shape each having a thickness of about $1\mu$. This iron powder is treated at 300° C. in a mixed atmosphere of hydrogen and steam, from which the flattened magnetite is obtained. A coating lacquer prepared from these flat magnetic particles is applied to a carrier and dried in a cross magnetic field to form an excellent magnetic recording material. In this way, particles of large size are easily obtained which are suitable for the recording of low frequencies. The orientation of particles in this case may be freely selected according to the magnetic field to be used.

What is claimed is:

1. A magnetic sound record comprising non-magnetic carrier, a lacquer coating on said carrier, and particles of gamma ferric oxide in the form of thin flat plates in said coating, said thin flat plates having a thickness which is about one-tenth of the length, the length and the width of the thin flat plates being substantially equal, said thin flat plates being oriented in the coating in a manner so that the flat plates are substantially parallel to the carrier.

2. A method of preparing a magnetic record medium to have substantially equal magnetization characteristics in all directions lying within a plane parallel to said medium; said method comprising forming thin flat plates of gamma ferric oxide having a thickness which is about one-tenth the length thereof, the length and width of each plate being substantially equal, and bonding said plates with a lacquer coating to a non-magnetic carrier in substantially coplanar relationship and parallel to said carrier.

(References on following page)

References Cited in the file of this patent

UNITED STATES PATENTS

| | | |
|---|---|---|
| 2,389,734 | Mehl | Nov. 27, 1945 |
| 2,688,567 | Franck | Sept. 7, 1954 |
| 2,689,167 | Dovey et al. | Sept. 14, 1954 |
| 2,694,656 | Camras | Nov. 16, 1954 |
| 2,711,901 | Van Behren | June 28, 1955 |
| 2,796,359 | Speed | June 18, 1957 |

OTHER REFERENCES

Stuijts et al.: "Crystal-Oriented Ferroxplana," Philips Technical Review, vol. 19, No. 7–8, pp. 209–217, Feb. 10, 1958.